March 11, 1941.  G. D. WILKINSON  2,234,787
ELECTRIC OVEN
Filed Nov. 3, 1938   2 Sheets-Sheet 1
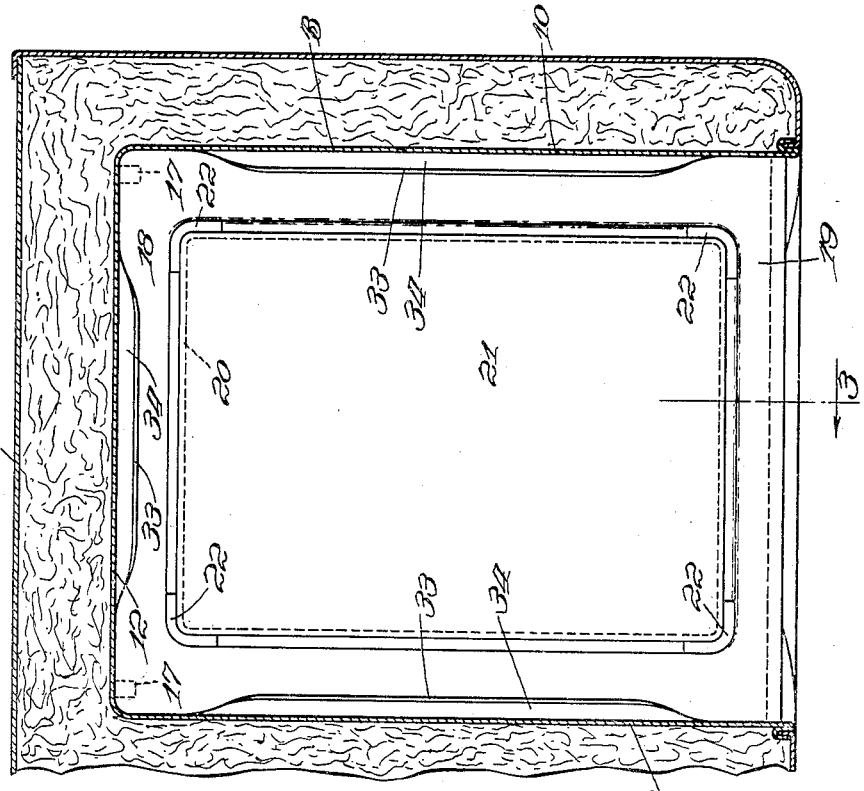
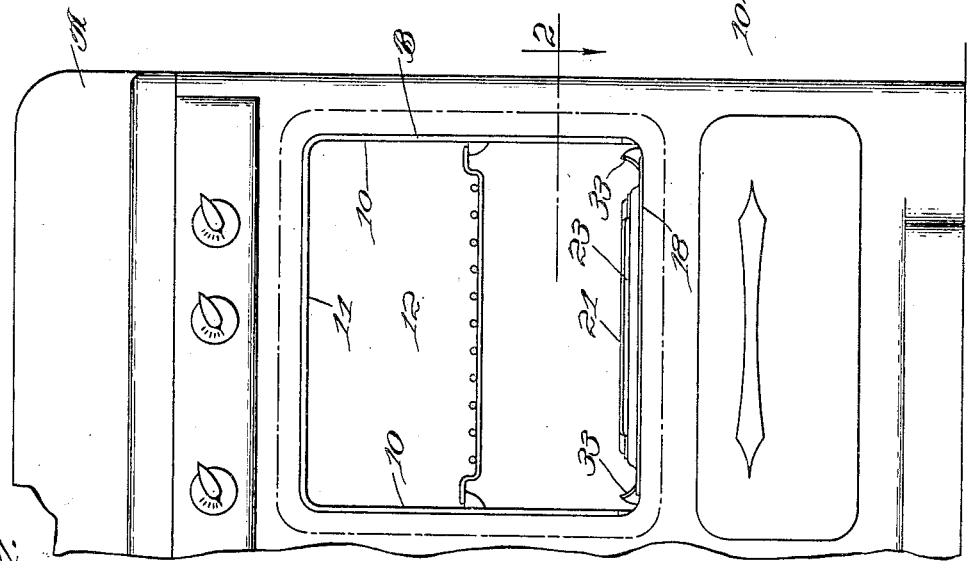
Inventors:
George D. Wilkinson
and William D. Kelly.
By Chritton, Wiles, Davies, Hirschl and Dawson.
Attys.

March 11, 1941.                G. D. WILKINSON                2,234,787
                                 ELECTRIC OVEN
                         Filed Nov. 3, 1938          2 Sheets-Sheet 2

Inventors:
George D. Wilkinson
and William D. Kelly.
By Chritton, Wiles, Davies, Hirschl and Dawson.
Attys.

Patented Mar. 11, 1941

2,234,787

UNITED STATES PATENT OFFICE 2,234,787

ELECTRIC OVEN

George D. Wilkinson, Oak Park, and William D. Kelly, Western Springs, Ill., assignors to Cribben and Sexton Company, Chicago, Ill., a corporation of Illinois Application November 3, 1938, Serial No. 238,690

2 Claims. (Cl. 219—35)

This invention relates to an electric oven. It is particularly useful in connection with a range where an electric heating element is used for heating the oven.

It has heretofore been the practice to support an electric resistance heating element on a removable tray or supporting member carried at an intermediate point in the oven. The difficulty with this structure is that the electric resistance element occupies considerable space and offers an obstruction to foods which are being cooked above or below the heating element. Furthermore, the heating element, in addition to being bulky, is unattractive in appearance and spoils the appearance of the oven.

An object of the present invention is to provide an electric oven in which the resistance heating element is disposed in a compartment below the oven floor and where it is concealed entirely by the floor, means being provided for causing an efficient circulation of heated air through the oven. A further object is to utilize space below the oven floor which has heretofore not been utilized while at the same time providing a means for concealment of the heating element, the floor being so fashioned and shaped as to provide an efficient means for circulating air about the resistance element and about the oven. A further object is to provide an electrically heated oven in which the oven space proper is open and free, the source of heat being supplied from outside of the oven compartment proper. Other specific objects and advantages will be apparent as the specification proceeds.

Figure 3:
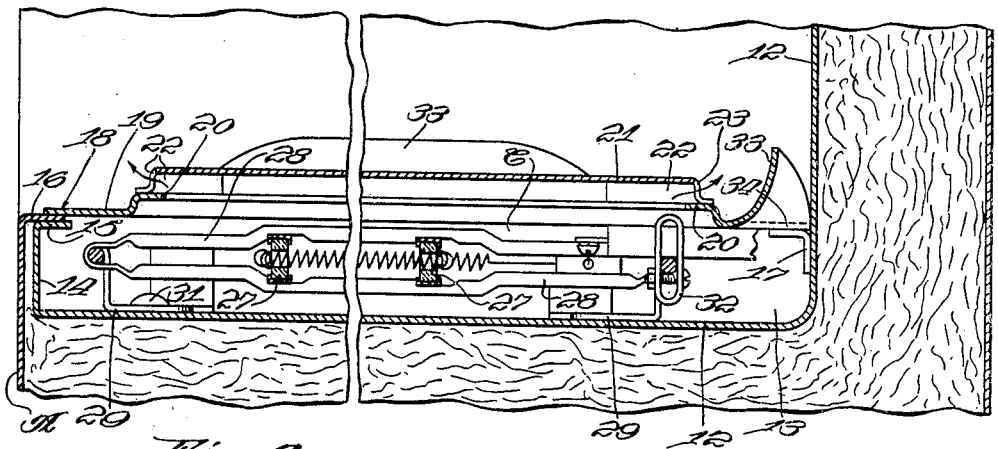
Figure 4:
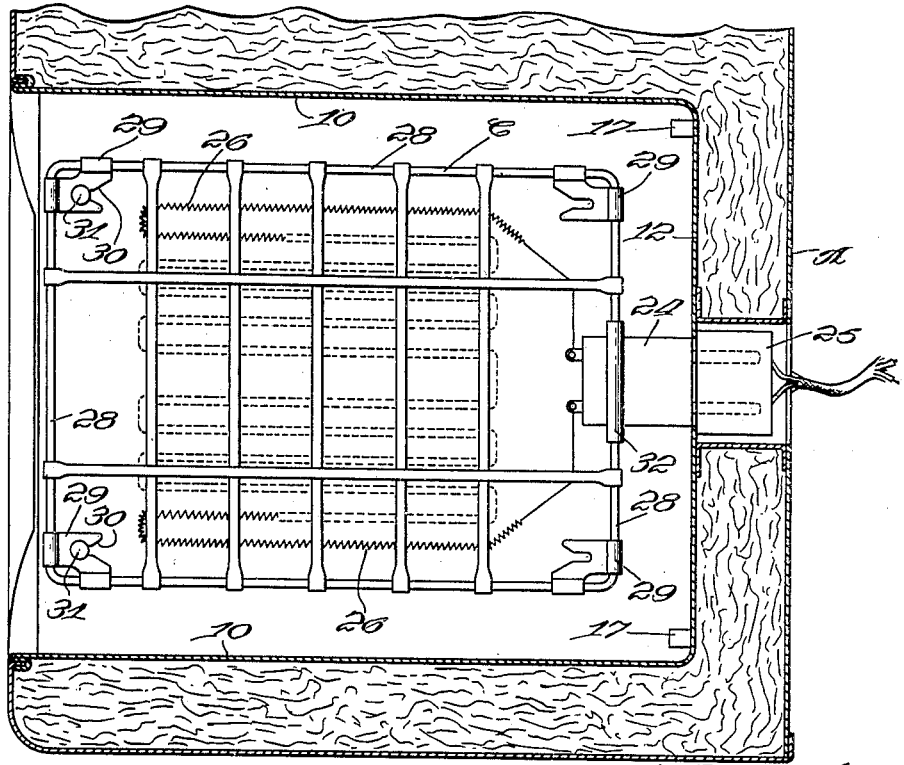

The invention is illustrated, in its preferred embodiment, by the accompanying drawings, in which:

Figure 1 is a broken front view in elevation of an electric range embodying my invention, the door of the oven being removed; Fig. 2, a transverse sectional view, the section being taken as indicated at line 2 of Fig. 1; Fig. 3, a broken vertical sectional view, the section being taken as indicated at line 3 of Fig. 2 and the structure being shown in enlarged form; and Fig. 4, a plan view, similar to Fig. 2, but the floor of the oven being removed.

In the illustration given, A designates an electric range; B, an oven therein; and C, an electric resistance heating element disposed below the oven.

The range A may be of any suitable type or construction.

The oven B may also be of any suitable type or construction. In the illustration given, it is shown provided with side walls 10, the top wall 11, and the rear wall 12. As shown more clearly in Fig. 3, the rear wall 12 is extended below the normal bottom of the oven and then forwardly to form a compartment 13 below the bottom of the oven and adapted to receive the heating element C. The wall 12, at its forward end, is turned upwardly at 14, and the top horizontal flange thereof secured to the front wall of the range casing A which, at this point, is provided with a horizontal inwardly turned flange 16. At the rear of the oven, the back wall 12 is provided with a pair of bracket supports 17 which, together with the front flange 16 of the casing A, provide a support for the bottom 18 of the oven.

The bottom 18 of the oven will now be described. The bottom 18 is formed from a wide flat strip of metal which is shaped to fit the interior of the oven. The front portion of the flat strip 19 of the bottom rests upon the flange 16, while the rear portion thereof rests upon the bracket support 17. Positioned inwardly from the flat border 19 of the bottom 18 is an upwardly struck portion forming a plateau or shelf 20. The plate 21 is provided at its corners with downwardly extending legs which rest upon the shelf or platform 20 and are welded thereto. Between the legs 22 are open spaces 23 through which air may freely escape into the oven compartment.

The electric resistance heating element C may be of any suitable type or structure. It is housed within the compartment 13 below the oven bottom 18. The member C is provided with a connector plug 24 which extends within the electric socket 25 carried by the casing A. From the plug 24, electric resistance element 26 extends about insulators 27 carried by a frame 28. The frame 28 is provided at its corners with depending bracket supports 29 each being provided with a notch 30 adapted to receive fastening posts 31 secured to the bottom wall 12. The plug 24 is secured to the frame 28 by means of a metal loop securing member 32. In the structure shown, it will be observed that only two securing posts are provided which are spaced at the opposite end of chamber 13 from socket 25, thus permitting the frame to be disengaged from the chamber 35 when the plug 24 is withdrawn from socket 25.

To permit the circulation of air along the walls of the oven and down into the rear compartment 13, we flare portions of the sides of the bottom 18 inwardly to provide upwardly extending flanges 33, the flanges 33 providing between them and the adjacent wall of the oven air flow passages 34.

*Operation*

In the operation of the apparatus, the parts may be assembled as follows: The bottom floor 18 being removed, the electric heating element 16 is placed within the compartment 13 below the oven and the plug 24 inserted within socket 25. Simultaneously the locking supports 29 are brought into engagement with the headed pin 31 so that the heating element is securely held within the compartment 13. The oven bottom 18 is then placed in position with the flat front portion 19 resting at its front upon flange 15 of casing A and at its rear upon the bracket support 17.

The oven may then be operated as any other oven. When current is supplied to the heating element, heated air rises through the central portion of the floor 18 and escapes upwardly through the lateral opening 23 provided below plate 21. Air circulates along the sides of the oven and enters into the compartment below the bottom 18 through the apertures 34, the upwardly flared flanges tending to direct the cooler air downwardly into compartment 13.

If it is desired to repair the element C or if it is desired to clean the bottom 18 and the compartment 13 therebelow, the bottom 18 may be readily lifted off the flange 16 and the support 17, and the heating element C may be readily removed by drawing it in a direction away from the socket 25. This movement also causes the pins or studs 31 to be released from engagement with the depending bracket support 29, so that the entire element can be readily lifted out of the oven. The re-assembly of the parts, after repair or cleaning, is as has already been described.

With the oven disclosed, it will be observed that the entire space within the oven is now free for utilization, there being no obstruction in the nature of heating elements, etc. At the same time, heat is shown effectively applied to the oven from the compartment below, the heating element being entirely concealed by the floor of the oven. The heated air is allowed to rise naturally and directly above the heating element and to be directed into the central portion of the oven interior while, at the same time, cool air is allowed to circulate and be directed downwardly by flanges 13 into the compartment where it is brought into contact with the heating element C. Thus, by a very simple and inexpensive structure, the oven is permitted to be utilized in its entirety, the heating element being wholly hidden from view while, at the same time, effective heating and circulation of hot air is brought about. At the same time, the heating element and the compartment therebelow is as readily accessible as the element and supporting structure therefor heretofore used.

While in the foregoing description, we have set forth a specific embodiment as illustrative of the invention, it will be understood that there may be a great many different types of structure employed, and these will readily occur to those skilled in the art and may be employed by them without departing from the spirit of our invention.

The foregoing detailed description has been given for clearness of understanding only, and no unnecessary limitations should be understood therefrom.

We claim:

1. In combination with a range oven compartment provided at its front bottom side with a casing flange and at its rear side with spaced supports spaced from the bottom of the compartment, a removable bottom wall resting upon said front flange and said supports on the rear wall, said bottom being snugly fitted in said compartment with the edges of the bottom engaging the walls of the compartment, portions of said edges being pressed upwardly and inwardly out of engagement with said walls to provide peripheral openings between the bottom and the walls of the compartment, an electric resistance heater supported below said bottom and concealed thereby, means for permitting heated air from said electric heater to be discharged into said oven compartment, said means including a centrally disposed opening in said bottom, a plate substantially smaller than said bottom supported above said opening and providing between said plate and said bottom elongated air passages communicating with the central portion of the oven.

2. In combination with a range oven compartment provided along the inner sides thereof with supports spaced from the bottom of the compartment, a removable bottom wall resting upon said supports, said bottom being snugly fitted in said compartment with the edges of the bottom engaging the walls of the compartment, portions of said edges being pressed upwardly and inwardly out of engagement with said walls to provide peripheral openings between the bottom and the walls of the compartment, an electric resistance heater supported below said bottom and concealed thereby, and means for permitting heated air from said electric heater to be discharged into said oven compartment, said means including a centrally disposed opening in said bottom, and a plate substantially smaller than said bottom supported above said opening and providing between said plate and said bottom elongated air passes communicating with the central portion of the oven.

GEORGE D. WILKINSON.
WILLIAM D. KELLY.